United States Patent [19]
Cornwell

[11] Patent Number: 5,824,148
[45] Date of Patent: Oct. 20, 1998

[54] SOUND ABSORBING CEMENTITIOUS COMPOSITION AND METHOD OF MAKING SAME

[76] Inventor: Charles E. Cornwell, 5902 Mount Eagle Dr., Alexandria, Va. 22303

[21] Appl. No.: 857,851

[22] Filed: May 16, 1997

[51] Int. Cl.$^6$ .......................... C04B 38/00; C04B 38/10; C04B 24/16
[52] U.S. Cl. .......................... 106/678; 106/679; 106/680; 106/681; 106/682; 106/675; 106/705; 106/719; 106/726; 106/122; 106/DIG. 2; 106/676; 106/709; 252/62; 264/41; 264/45.3; 264/50; 264/51
[58] Field of Search ..................................... 106/672, 675, 106/676, 677, 678, 679, 680, 681, 682, 705, 711, 709, 122, 809, DIG. 1, DIG. 2, 719, 726; 252/62; 264/41, 45.3, 51, 50

[56] References Cited

U.S. PATENT DOCUMENTS 3,989,534  11/1976  Plunguian et al. ...................... 106/675
4,741,782   5/1988  Styron .................................... 106/709
5,250,578  10/1993  Cornwell ................................ 106/122
5,678,363  10/1997  Ogorchock et al. ...................... 52/144

*Primary Examiner*—Michael Marcheschi
*Attorney, Agent, or Firm*—Breiner & Breiner

[57] ABSTRACT

The invention relates to an improved sound absorbing cementitious composition and method of making involving a preformed foam solution made from a surfactant, such as an ammonium salt of a sulfated linear alcohol ethoxylate surfactant, preblended with water at a dilution ratio in a range of water to surfactant of from about 40:1 to 10:1. Thereafter, the preformed foam solution is combined with components including cement(s), aggregate(s), water and optional additives. The composition provides for an open cellular surface capable of absorbing sound.

24 Claims, 1 Drawing Sheet

SOUND ABSORBING CEMENTITIOUS COMPOSITION AND METHOD OF MAKING SAME

FIELD OF INVENTION

The invention relates to an improved cementitious composition and methods of providing the composition which involve combining a cementitious matrix with a preblended solution of water and surfactant, in particular an ammonium salt of a sulfated linear alcohol ethoxylate surfactant. The composition has an interconnected cellular structure and is capable of absorbing sound waves, providing thermal insulation and fire proofing.

BACKGROUND OF THE INVENTION

U.S. Pat. No. 3,819,388, having the same inventor as the present invention, describes a process for forming lightweight cellular cementitious compositions from a mineral cement, a lightweight mineral aggregate, a nonionic surfactant, water, and, optionally, polyvinylacetate. The nonionic surfactant acts as a bubble forming additive to provide a cementitious composition that has a cellular structure with equal distribution of cells throughout the composition. The nonionic surfactant can be combined with an anionic surfactant in use. The water utilized in the processing is required to render the cement settable.

U.S. Pat. No. 4,077,809 describes improvements in the stabilization of aqueous foamed compositions which involve the incorporation of certain synthetic resin emulsions which are film formers at room temperature into an aqueous foaming composition. The synthetic resin and plasticizer components of these emulsions have a glass transition temperature of about 10° C.–25° C. Suitable components in these emulsions are vinyl acetate, an acrylate homo-, co- or terpolymer, and styrene butadiene resins.

U.S. Pat. No. 5,250,578, having the same inventor as the present invention, describes a lightweight cementitious composition produced utilizing the components of cement, aggregate, water, and a stabilized foaming composition which includes at least one water-soluble film forming agent and at least one foaming agent. Due to the method of making the composition using a mortar mixer (paddle mixer) or ribbon mixer to foam the slurry for forming the composition, however, a film forming agent is required. Further, the foaming is controlled based on the accuracy of the amounts of the required components as well as the action of the paddles or blades of the mixer used. Accordingly, room for error on the part of the manufacturer is present. If overmixing occurs when the aggregate is added to the composition, the density of the composition is caused to be increased. Overmixing kills the foam and, therefore, a higher density occurs. Further, the paddles or blades of the mixer are needed to provide sufficient foaming. The mixers function to fold air into the matrix and thus to combine air and foaming agent into the matrix. The physical mixing therefore is an important consideration. Compositions formed by these methods have, at best, a density of 35 pounds per cubic foot (PCF) and a compressive strength of about 300 pounds per square inch (PSI) while maintaining a Noise Reduction Coefficient(NRC) of 0.95, i.e., NRC is the average of the sound absorption coefficients at 250, 500, 1000 and 2000 Hz expressed to the nearest integral multiple of 0.05.

A composition having sound absorbing characteristics as well as increased strength and controllable density is desired without the need for tight manufacturing tolerances.

BRIEF DESCRIPTION OF THE INVENTION

The present invention is directed to improvements to the composition and methods described in U.S. Pat. No. 5,250,578. The improvements serve to provide added strength and stability to the composition as well as provide a more simple and reliable method of consistently making the desired composition.

The present invention provides a cementitious composition with sound absorbing capability having an interconnected open cellular structure such that at least 20–100% of the composition's surface area is open to provide access to sound waves and has an air-dry density in a range of about 12–95 pounds per cubic foot. The composition includes at least one cement, at least one aggregate, water and a foaming agent which is a surfactant solution. The surfactant of the surfactant solution is an ammonium salt of a sulfated linear alcohol ethoxylate, such as that sold under the tradename HYONIC PFM-33 by Henkel Corporation. HYONIC PFM-33 is more specifically an ammonium salt of a $C_{10-12}$ linear alcohol ethoxylate (2EO) sulfate with water as the carrier. The surfactant is preblended with water to form the surfactant solution at a dilution ratio of water to surfactant in a range of from about 40:1 to 10:1, with 20:1 being preferred. The preblending of the surfactant solution forms a foam solution or liquid which can be held in a holding tank until ready for use to form a cementitious composition. At that time, the preformed foam liquid is combined with cement(s), aggregate(s) and water. The resulting composition exhibits a compressive strength of from about 300 PSI to about 6000 PSI. Additionally, the resulting composition provides an open cellular surface. The cement slurry does not block the porosity of the surface. Thus, in use of the composition, i.e., following pouring and setting in a mold, further processing such as washing of the surface is not required to provide an open cellular surface. This results in significant time and service savings.

Therefore, it is an object of the present invention to provide a cementitious composition that is capable of absorbing sound waves which is easy to manufacture.

It is another object of the present invention to provide a cementitious composition which is formed using a preformed foam liquid based on a surfactant solution that avoids defoaming upon overmixing as can result with conventional cementitious compositions and methods.

It is a further object of the present invention to provide a cementitious composition having a greater compressive strength than prior compositions while maintaining a Noise Reduction Coefficient(NRC) of about 0.95.

DETAILED DESCRIPTION OF THE PRESENTLY PREFERRED EMBODIMENTS

Figure 1:
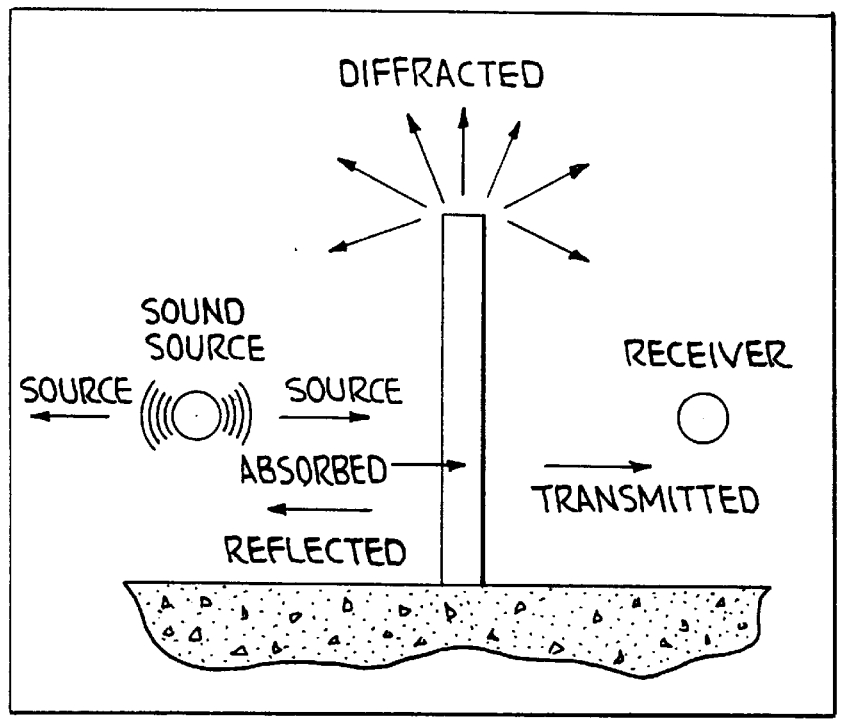
FIG. 1 is a schematic illustrating the interaction between sound and a barrier formed of a cementitious composition.

The present invention provides improvements in the composition and methods described in U.S. Pat. No. 5,250,578, which is herein incorporated by reference. The improvements provide added strength and stability to the composition as well as provide a more simple and reliable method of consistently making the desired composition. The added strength and stability of the composition and the reliability in mixing is provided based on the use of a specific foaming agent which is a preformed surfactant solution based on a surfactant and water. The surfactant which provides the results desired is an ammonium salt of a sulfated linear alcohol ethoxylate, such as sold under the tradename HYONIC PFM-33 by Henkel Corporation. HYONIC PFM-33 is more specifically an ammonium salt of a $C_{10-12}$ linear alcohol ethoxylate (2EO) sulfate having water as the carrier, 33% actives. Surfactants other than an ammonium salt of a sulfated linear alcohol ethoxylate were tested, but only the surfactant of the invention was found to provide the desired results.

The advantageous method of the present invention involves (1) preforming a foam solution or liquid from a surfactant and water blended together and (2) combining the preformed foam solution or liquid with a matrix including at least one cement, at least one aggregate, water and optionally additives such as a water-reducing agent, fly ash, fibers, a colorant and the like. When the desired density of the combination is achieved, the resulting material can be transported and poured into a mold where it is then allowed to set. An open cellular surface is provided upon removal of the mold without further processing.

As to the preforming of a foam solution or liquid, the surfactant is diluted with water at a ratio of water to surfactant in a range of from about 10:1 to 40:1, preferably 20:1. The surfactant is an ammonium salt of a $C_{10-12}$ linear alcohol ethoxylate (2EO) sulfate with water as the carrier, 33% actives. The preformed solution can be held in a holding tank until ready to use. Based on the inclusion of the preformed foam solution in the overall composition, the inclusion of a film-forming agent as described in U.S. Pat. No. 5,250,578 is not required. While a film-forming agent can be included without detriment to the composition, the composition has been determined to give the same or better results without the inclusion of a film-forming agent based on the inclusion of the preformed foam solution. Thus, savings in terms of time and materials is achieved as well as the other advantages described herein.

Following preforming the foam solution, the solution is combined with cement(s), aggregate(s), water and optional additives. In a first preferred embodiment, the cement(s), aggregate(s), water and optional additives are dispersed to provide a uniform admixture and, thereafter, the preformed foam solution is added to the admixture. The amount of preformed foam solution added to the admixture depends on the density desired in the final composition. The density can be between about 12–95 pounds per cubic foot (PCF), with the preferred density being in the range of from about 35–95 PCF. For example, 35 PCF has a compressive strength of approximately 300 PSI while maintaining a NRC of 0.95, i.e., it will absorb 95% of the sound which impinges on the sound barrier structure. Another example, a matrix having a density of 47 PCF has a compressive strength of 700 PSI while maintaining a NRC level which is acceptable to transportation authorities when such material is used to provide roadside sound barriers. The new composition and method of the invention has been found to provide a 133% increase in strength while maintaining an acceptable NRC level. This is a significant improvement. The best compressive strength of the composition described in U.S. Pat. No. 5,250,578 was approximately 300 PSI while maintaining the NRC of 0.95 with a wet density of 35 PCF.

The combining of the preformed foam liquid with the components of the admixture described above can be by simple blending or mixing. The use of paddles or blades to generate foam while folding in air and combining a foaming agent and air into the matrix is not required in the method of the present invention.

In a second preferred embodiment, the preformed foam liquid can be combined with cement(s), aggregate(s), water and optional additives by means of a nozzle through which high pressure air is pumped together with the preformed foam liquid. This method allows for further aeration of the foam solution prior to combining with the other components of the cementitious composition.

The air volume and pressure are maintained as close as possible to the liquid pressure. Both liquid and air are regulated by valves or by the size of the tubing conveying the air and liquid under pressure. A pressure of 60 PSI for both air and liquid have been found to be sufficient. While the foam liquid is further aerated in the nozzle, yet further aeration of the foam liquid may be optionally provided, for example, by adding a static mixer with seven or more elements, or using a set of fine screens, through which the discharge from the nozzle can pass prior to combination with the other composition components. An increased aeration of the foam liquid provides a drier foam which in turn results in a cement matrix with less water and ultimately a greater compressive strength. Following discharge from the nozzle, the aerated foam liquid is combined with the cement(s) component(s) and any optional additives to be included. Once a uniform admixture is obtained, the aggregate(s) are added to the admixture. Mixing continues until a uniform admixture is obtained. The mixture is then checked for density. Once the desired density is reached, the composition is complete and ready for use by pouring into a suitable mold. Following setting and removal of the mold, the composition provides an open-cellular structure capable of absorbing sound without further processing.

The preformed foam solution of the invention provides acceptable foaming to the cementitious composition regardless of the apparatus used to prepare the composition. Since the methods of the present invention do not depend on the mixing apparatus, the methods of the invention provide for superior methods of making a cementitious composition. In using the preformed foam liquid, there is minimal likelihood that the composition will be improperly formed. This results in time and material savings and, thus, cost savings.

In each embodiment, if the final composition is made with added thickness, such added thickness improves the lower Hz absorption rates.

Suitable cements useful in the present invention include portland cement, calcium cement, gypsum cement, magnesia or magnesium oxide cement and the like. Suitable aggregates include the lightweight variety such as perlite, vermiculite, expanded shale, clay, and sand as well as heavier aggregates such as ground up volcanic lava, (heat) expanded clay, ground up tires, steel bands, nylon and polyester fibers, and the like. The preformed foam solution also functions as a lubricant for the aggregate(s) and facilitates a drier overall mix. The present invention allows for the use of heavier aggregates than those used in prior compositions. For example, volcanic lava can be ground and used as a heavy aggregate in place of lightweight aggregates such as perlite and vermiculite. A heat expanded clay can also be used as an aggregate, which is much stronger than perlite and vermiculite. When used in the present invention, expanded clay with a density of 80 PCF can produce a composition having a compressive strength of 6000 PSI. The use of heavier aggregates, however, may lower the NCR rating. Mixtures of ground lava and expanded clay with perlite or vermiculite can be advantageous for use in the present invention.

Automobile and similar tires are useful as aggregates. Such tires are ground and can be added to a sound absorbing matrix at a ratio of 0 to 50 percent by weight of the matrix.

Steel bands, nylon fibers, and polyester fibers can also be added to the matrix. The fiber additive is preferably included in no more than 2% by weight of the fibers to the weight of the matrix. Additionally, any steel cut into fiber should preferably be stainless steel.

A suitable optional additive is a colorant. Titanium dioxide, iron oxide, ferric oxide, and chromium oxide are all useful as color pigments in the composition of the present invention. Another optional additive is fly ash.

A water reducing agent can be included as taught in U.S. Pat. No. 5,250,578. However, such is not required. If a water-reducing agent is not included, a little more water is included in the composition to compensate. When added, a water reducing agent is added at the time the cement(s) is(are) added.

Another optional component is micro silica which can be included in an amount of about 0–10%. Micro silica serves to increase the viscosity of the composition mixture.

A further optional component or components are those which would provide the foamed composition with fire resistance. For example, any compound which is known in the art for fire proofing cementitious compositions are suitable for use. Particular fire proofed cementitious compositions known in the art which can be beneficially prepared according to the present invention is as described in U.S. Pat. Nos. 3,819,388 and 4,077,809, each having the same inventor as the present invention and being incorporated herein by reference. The compositions described therein can be prepared according to the process of the present invention, including incorporating therein the above-described surfactant, to provide advantageous sound absorbing fire resistant cementitious compositions.

FIG. 1 illustrates schematically that sound interacts with a barrier in three ways. Sound may be partially transmitted through the barrier, partially reflected by the barrier back towards the sound source or diffracted by the top edge into sound that goes in all different directions.

More specifically, regarding the sound absorption by the barrier, when sound impinges upon a barrier, part of the sound energy is reflected and part is absorbed. The absorption usually takes place in either of two ways, i.e. transmission through the barriers or conversion of the acoustic energy into heat by the barrier material. The amount of sound energy absorbed by a material is determined by a standardized test procedure ASTM C423-90a entitled "Standard Test Method for Sound Absorption and Sound Absorption Coefficients By The Reverberation Room Method". The amount of absorption is expressed as the ratio of the sound energy absorbed to the sound energy incident to the barrier surface. This ratio is called the absorption coefficient, usually denoted as A. The more sound energy absorbed, the closer this coefficient is to 1.0. Thus, when A=0, no sound energy is absorbed and all incident sound energy is reflected. Conversely, when A=1.0, all the sound energy is absorbed and none of the incident energy is reflected. The sound absorbing properties of materials vary with frequency and as is the case with transmission loss data, sound absorption data is stated as a function of ⅓ octave frequency bands for 100 to 5000 Hz. Sound absorption data is often combined into a single number called the noise reduction coefficient, NRC, which is obtained from the average value of A at 250; 500; 1000 and 2000 Hz rounded to the nearest multiple of 0.05. The higher the NRC value, the greater the average sound absorption in this frequency range.

Sound absorbing tests performed utilizing cementitious compositions of the present invention were conducted on the basis that the sound absorption coefficient of a surface in a specified frequency band is, aside from the effects of diffraction, the fraction of randomly incident sound energy absorbed or otherwise not reflected. The unit of measurement is sabin per square foot. The noise reduction coefficient (NRC) as set forth above is the average of the sound absorption coefficients at 250; 500; 1000 and 2000 (Hz) expressed to the nearest integral multiple of 0.05.

Measurements made during the testing were according to ASTM designation C423-90a. Standard mountings were utilized as defined in ASTM designation E795-91 entitled "Standard Practices For Mounting Test Specimens During Sound Absorption Test".

The test specimens utilized were nine 34 inch wide by 34 inch long by 3½ inch thick panels in a Type A mounting forming a test specimen 102 inches wide by 102 inches long by 3½ inches thick. A wooden frame was placed around the perimeter edges of the specimen to minimize edge absorption. The weight of the specimen was 1020 pounds. The area used to calculate sound absorption coefficients was 72.3 square feet, this area being the face of the overall specimen.

Figure 2:
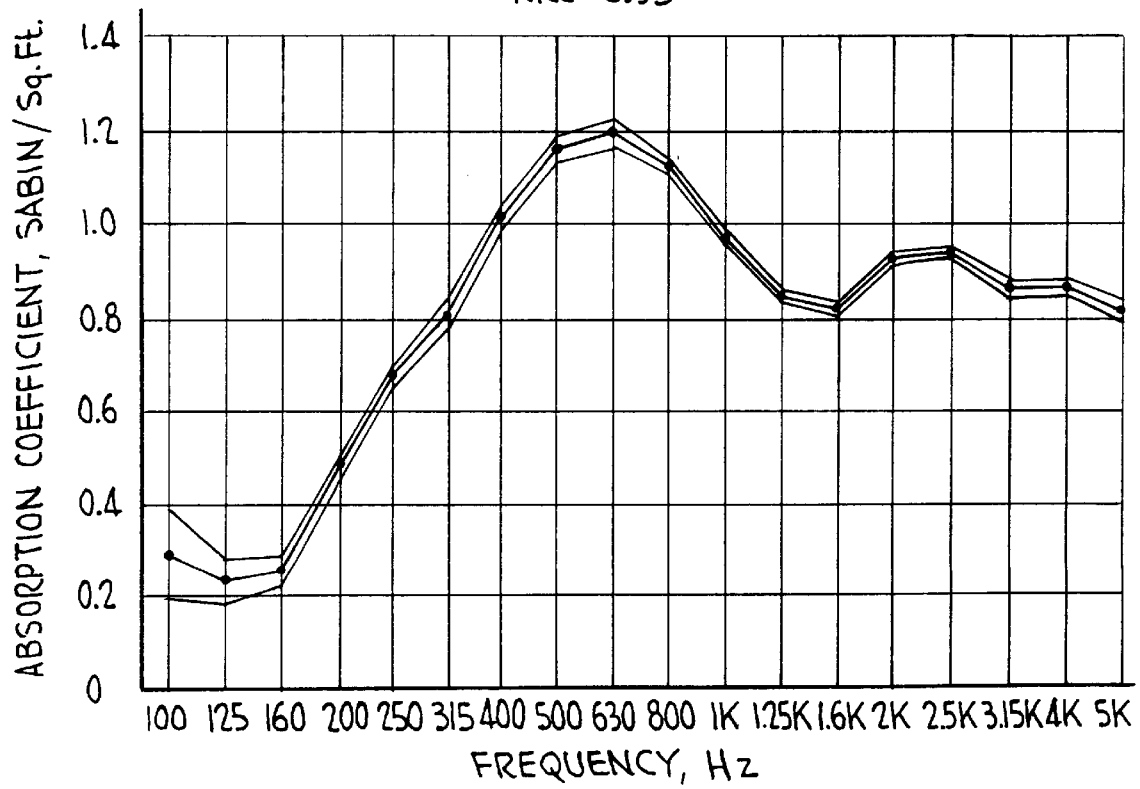
FIG. 2 is a graph showing calculated values of sound of test specimens and sound absorption coefficients together with the calculated measurement of uncertainty for each.

The calculated values of sound absorption of the specimen and sound absorption coefficients together with the calculated measurement of uncertainty for each are tabulated in Table I below. As shown in Table I, the tests showed that an open cellular free draining cementitious composition of the present invention as tested had a NRC value of 0.95 which indicates excellent sound absorbing capability. "Sabin average" indicates the absorption rate. The testing data and test results are also shown graphically in FIG. 2.

TABLE I

| Frequency (Hz) | Sabin Average | Deviation | Coefficient (Sabin/ft.$^2$) | Deviation |
| --- | --- | --- | --- | --- |
| 100 | 21.3 ± | 7.2 | 0.29 ± | 0.1 |
| 125 | 16.9 ± | 3.8 | 0.23 ± | 0.05 |
| 160 | 18.4 ± | 2.3 | 0.25 ± | 0.03 |
| 200 | 34.7 ± | 2 | 0.48 ± | 0.03 |
| 250 | 49.1 ± | 1.7 | 0.68 ± | 0.02 |
| 315 | 58.5 ± | 2.3 | 0.81 ± | 0.03 |
| 400 | 73.9 ± | 2.4 | 1.02 ± | 0.03 |
| 500 | 84.9 ± | 2.1 | 1.17 ± | 0.03 |
| 630 | 86.4 ± | 2 | 1.2 ± | 0.03 |
| 800 | 82 ± | 1.5 | 1.13 ± | 0.02 |
| 1K | 70.3 ± | 1.3 | 0.97 ± | 0.02 |
| 1.25K | 61.4 ± | 1 | 0.85 ± | 0.01 |
| 1.6K | 59.3 ± | 1.2 | 0.82 ± | 0.02 |
| 2K | 67 ± | 1.3 | 0.93 ± | 0.02 |
| 2.5K | 69 ± | 1.1 | 0.95 ± | 0.01 |
| 3.15K | 62 ± | 1.3 | 0.86 ± | 0.02 |
| 4K | 62.7 ± | 1.4 | 0.87 ± | 0.02 |
| 5K | 59.5 ± | 2.3 | 0.82 ± | 0.03 |
| Noise Reduction Coefficient | | | 0.95 | |

As will be apparent to one skilled in the art, various modifications can be made within the scope of the aforesaid description. Such modifications being within the ability of one skilled in the art form a part of the present invention and are embraced by the appended claims.

It is claimed:

1. A cementitious composition with improved sound absorbing capability having an interconnected open cellular structure such that at least 20–100% of said composition's surface area is open to provide access to sound waves and has an air-dry density in a range of about 12–95 pounds per cubic foot, the composition comprising at least one cement, at least one aggregate, water, and a foaming agent, wherein the foaming agent is a surfactant solution comprising an ammonium salt of a $C_{10\text{-}12}$ linear alcohol ethoxylate (2EO) sulfate surfactant that is preblended with water at a dilution ratio in a range of water to surfactant of from about 40:1 to 10:1.

2. A cementitious composition according to claim 1 wherein said dilution ratio is about 20:1.

3. A cementitious composition according to claim 1 further comprising fly ash.

4. A cementitious composition according to claim 1 further comprising a colorant.

5. A cementitious composition according to claim 1 further comprising at least one fire proofing component.

6. A cementitious composition according to claim 1 wherein said at least one cement is selected from the group consisting of portland cement, calcium cement, gypsum cement, magnesium oxide cement and mixtures thereof.

7. A cementitious composition according to claim 1 wherein said at least one aggregate is selected from the group consisting of perlite, vermiculite, expanded shale, clay, sand, volcanic lava, expanded clay, ground tire and mixtures thereof.

8. A cementitious composition according to claim 7 wherein when said at least one aggregate is ground tire, said ground tire is present in an amount greater than zero and up to 50 percent by weight of the composition.

9. A cementitious composition according to claim 1 further comprising a fibrous material.

10. A cementitious composition according to claim 9 wherein said fibrous material is selected from the group consisting of fiberglass fibers and polyester fibers.

11. A cementitious composition according to claim 1 wherein said composition has a compressive strength of from about 300–6000 pounds per square inch.

12. A process of making a cementitious composition having improved sound absorbing capability such that at least 20–100% of said composition's surface area is open to provide access to sound waves and having an air-dry density in a range of about 12–95 pounds per cubic foot, the process comprising the steps of (a) blending water with a surfactant to provide a preformed foam liquid, said surfactant being an ammonium salt of a $C_{10\text{-}12}$ linear alcohol ethoxylate (2EO) sulfate, and the blending occurring at a dilution ratio in a range of water to surfactant of from about 40:1 to 10:1;

(b) forming a uniform mixture comprising at least one cement, at least one aggregate and water;

(c) combining the preformed foam liquid of (a) with the uniform mixture of (b); and (d) mixing the combination of (c) until a density of the composition is reached.

13. A process of making a cementitious composition having improved sound absorbing capability such that at least 20–100% of said composition's surface area is open to provide access to sound waves and having an air-dry density in a range of about 12–95 pounds per cubic foot, the process comprising the steps of (a) blending water with a surfactant to provide a preformed foam liquid, said surfactant being an ammonium salt of a $C_{10\text{-}12}$ linear alcohol ethoxylate (2EO) sulfate, and the blending occurring at a dilution ratio of water to surfactant in a range of from about 40:1 to 10:1;

(b) pumping under pressure air and said preformed foam liquid of (a) through a nozzle to aerate said preformed foam liquid;

(c) forming a mixture comprising at least one cement and water;

(d) combining aerated preformed foam liquid of (b) and said mixture of (c);

(e) combining at least one aggregate to combination of (d);

(f) mixing the combination of (e) until a density of the composition is reached.

14. Process according to claim 13 wherein following discharge from the nozzle of (b) and prior to step (d), the preformed foam liquid is further aerated by passing said foam liquid through a static mixer or a series of screens.

15. Process according to either of claims 12 or 13 wherein said dilution ratio is about 20:1.

16. Process according to either of claims 12 or 13 wherein said mixture additionally comprises fly ash.

17. Process according to either of claims 12 or 13 wherein said mixture additionally comprises a colorant.

18. Process according to either of claims 12 or 13 wherein said at least one cement is selected from the group consisting of portland cement, calcium cement, gypsum cement, magnesium oxide cement and mixtures thereof.

19. Process according to either of claims 12 or 13 wherein said at least one aggregate is selected from the group consisting of perlite, vermiculite, expanded shale, clay, sand, volcanic lava, expanded clay, ground tire and mixtures thereof.

20. Process according to claim 19 wherein said at least one aggregate is ground tire present in an amount above zero and up to 50% by wt. of the composition.

21. Process according to either of claims 12 or 13 wherein said mixture further comprises a fibrous material.

22. Process according to claim 21 wherein said fibrous material is selected from the group consisting of fiberglass fibers and polyester fibers.

23. A cementitious composition produced according to either of claims 12 or 13.

24. Process according to either of claims 12 or 13 wherein said composition has a compressive strength of from about 300–6000 pounds per square inch.

* * * * *